United States Patent [19]

Goertler et al.

[11] Patent Number: 4,520,271
[45] Date of Patent: May 28, 1985

[54] STOP-START DEVICE FOR A MOTOR VEHICLE ENGINE

[75] Inventors: Horst Goertler, Sachsenheim; Horst Rachner, Bietigheim-Bissingen, both of Fed. Rep. of Germany

[73] Assignee: ITT Industries, Inc., New York, N.Y.

[21] Appl. No.: 448,728

[22] Filed: Dec. 10, 1982

[30] Foreign Application Priority Data

Mar. 18, 1982 [DE] Fed. Rep. of Germany ....... 3209794

[51] Int. Cl.$^3$ .............................................. F02N 11/08
[52] U.S. Cl. ................................ 290/38 C; 290/36 A; 123/179 BG; 123/198 D; 307/10 BP
[58] Field of Search ........................... 290/36 A, 38 C; 123/179 B, 179 BG, 179 G, 198 D, 198 DB, 198 DC; 307/10 BP

[56] References Cited

U.S. PATENT DOCUMENTS

| | | | |
|---|---|---|---|
| 3,261,336 | 7/1966 | Lucas et al. | 123/198 D |
| 3,321,663 | 5/1967 | Poznik | 307/10 BP |
| 4,218,717 | 8/1980 | Shuster | 307/10 BP |
| 4,280,457 | 7/1981 | Bloxham | 123/198 D |
| 4,345,554 | 8/1982 | Hildreth | 123/179 BG |
| 4,414,937 | 11/1983 | Ueda et al. | 123/198 DB |

*Primary Examiner*—Vit W. Miska
*Assistant Examiner*—Shelley Wade
*Attorney, Agent, or Firm*—James B. Raden; William J. Michals

[57] ABSTRACT

In a so-called stop-start device for a motor vehicle engine particular consuming devices in the motor vehicle are changed over to a mode of operation with a lower current consumption, when the engine is switched off, or a switching-off of the engine is prevented, when functionally important consuming devices are switched on. Thus one achieves an appropriate compromise between saving of fuel and a satisfactory charge condition of the battery.

5 Claims, 1 Drawing Figure

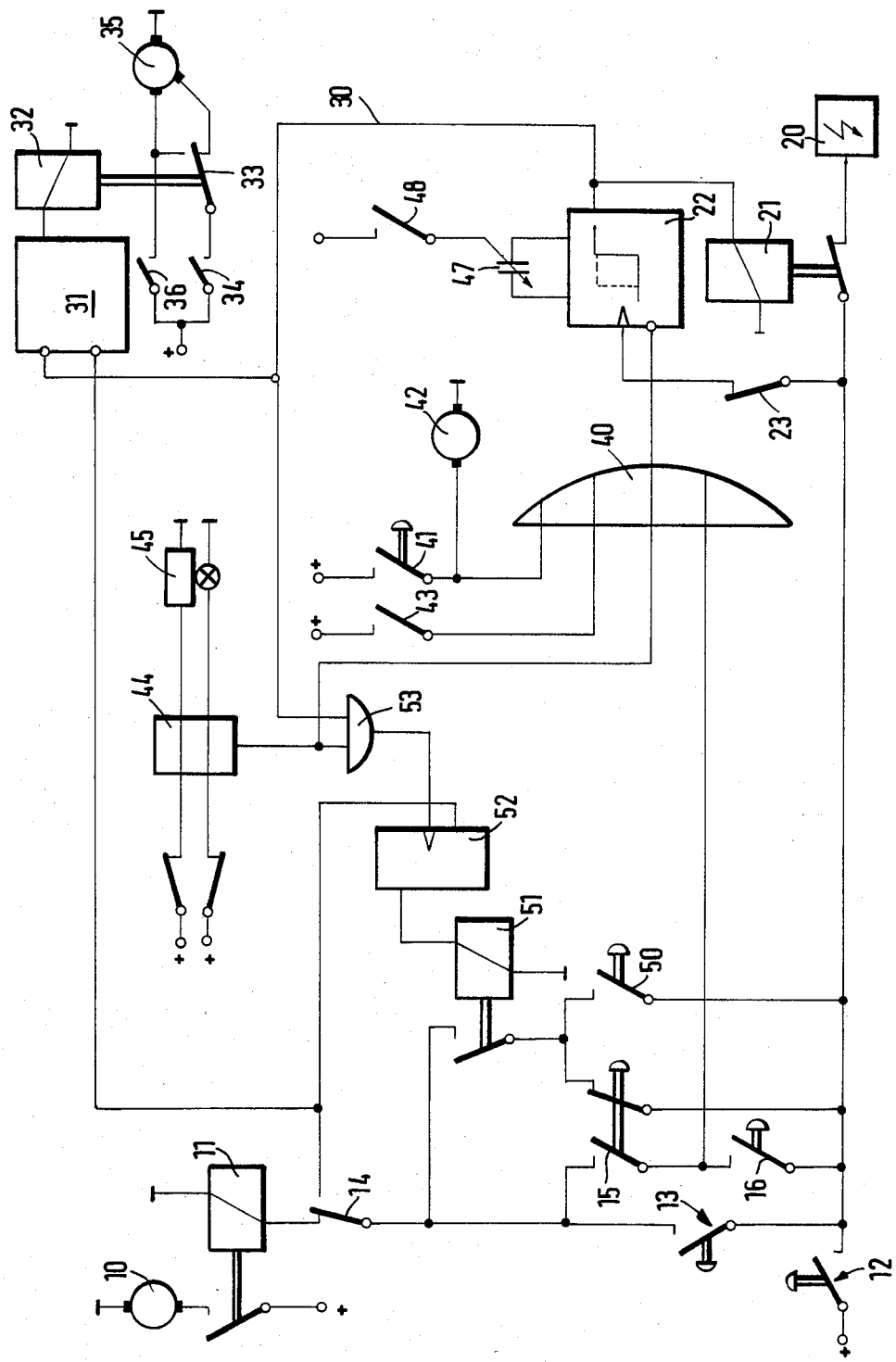

STOP-START DEVICE FOR A MOTOR VEHICLE ENGINE

BACKGROUND OF THE INVENTION

This invention starts from a stop-start device for a motor vehicle according to the features of the invention.

Stop-start devices have been fitted in motor vehicles, in which the engine is switched off upon actuation of a stop button insofar as the road speed has fallen below a value of, for example, 5 km per hour. Furthermore stop-start devices are known, in which the engine is automatically switched off with a given delay time after a stoppage of the motor vehicle. Such devices are intended to save fuel and prevent an exhaust of poisonous carbon monoxide. On the other hand a switching off of the engine which, as is known drives the generator of the vehicle, of course affects the charge condition of the vehicle battery especially if consuming devices with a high current consumption are switched on. The known devices have therefore been developed in a way that in order to reduce the current consumption the rear window heating installation is switched off at a standstill of the engine. But this principle cannot applied to all other consuming devices in a motor vehicle, because the operational reliability would thereby be impaired.

The invention is based on the problem of developing a stop-start device of the known kinds in a way that an appropriate compromise is achieved between saving of fuel and a charge condition of the battery, which is sufficient for functionally important consuming devices, and further operating conditions in the motor vehicle.

SUMMARY OF THE INVENTION

This problem is solved by the characterising features of the invention. The invention is thereby based on the idea, that at a standstill of the vehicle the functioning of particular and important consuming devices has to be ensured, but on the other hand they need not be operated at full capacity. For example the speed of the wiper motor or blower motor can be reduced without impairing the safety. There are, however, various consuming devices in a motor vehicle whose switching off does not seem to be reasonable, but a reduction of their capacity seems to be appropriate. Moreover there are also consuming devices in a motor vehicle whose functioning has to be ensured in any case also over a longer period of time. In this connection it is, for example, pointed out to a power-assisted braking system, which is operated by an electric drive motor. It is, indeed, also conceivable to reduce the capacity of this electric motor, because at a standstill of the vehicle the braking-power assistance necessary is relatively small, but there might be cases in which it is not possible to forgo the full braking-power assistance. For vehicles equipped with consuming devices of this kind according to another solution of the problem based to the present invention a switching off of the engine is blocked according to the invention. Thus in this solution priority is given to a sufficient charge condition over a saving of fuel. This solution, of course, can be used independently of the first-mentioned version with a reduction of current consumption. Especially preferred are, however, combinations of a kind in which a switching off of the motor vehicle engine is prevented, when particular consuming devices are switched on, while a switching off of the engine is permitted, when other consuming devices are switched on whose capacity can be reduced.

BRIEF DESCRIPTION OF THE DRAWINGS

The invention is described below by way of a circuit diagram which only comprises its essential ideas and by no means all possible modifications in a motor vehicle.

DETAILED DESCRIPTION

The starter 10 of a motor vehicle engine can be supplied from a voltage source not shown in detail via a contact of a relay 11. This relay becomes energised, when the ignition switch 12 and the starter switch 13 are closed and when furthermore a switch 14 dependent on the rotational speed of the engine occupies a switching condition below a given revolutional speed of, for example, 500 revolutions per minute. A further switching-on circuit for starting the engine is formed by two switches 15 and 16, which bridge the starter switch 13. These switches are a clutch pedal switch 15 closing the switching-on circuit, when the clutch is operated, and an accelerator pedal switch 16 closing the switching-on circuit, when the accelerator pedal is operated. These two switches are combinedly designated as a start button, because they could be replaced by a push-button which may be actuated by the driver at random.

In the ignition circuit 20 the contact of s switching member 21 is looped, which is controlled by a delay circuit 22 triggered by a road-speed-dependent switch 23.

The mode of operation of conventional stop-start devices can already be explained by way of these components. At first it is assumed that the vehicle is at standstill and all switches occupy the position shown in the drawing. It is assumed that the motor vehicle engine is idle. If now the ignition switch 12 and the starter switch 13 are actuated, the starter relay 11 becomes energised and thus the starter 10 is supplied from the battery. Because the switching member 21 is not energised the ignition circuit 20 is also applied to the motor vehicle battery, so that the engine starts. As soon as the idle speed of 500 revolutions per minute is reached the engine-speed-dependent switch 14 and the starter 10 are switched off.

Now the vehicle is moved with the consequence, that the road-speed-dependent switch 23 opens. When the vehicle is brought to a standstill again thereafter and thus the road-speed-dependent switch 23 is closed again, the delay circuit 22 is triggered, so that after a given delay time the relay 21 is also energised. Thus the current supply of the ignition circuit 20 is interrupted and the motor vehicle engine is stopped. In order to start the engine again the accelerator pedal switch 16 and the clutch pedal switch 15 are simultaneously closed, so that the relay 11 is energised again, because the engine-speed-dependent switch 14 is closed, when the engine is idle.

The output of the delay member 22 is connected via a lead 30 with the set input of a memory 31, whose reset input is controlled by the engine-speed-dependent switch 14, when the motor vehicle engine has reached its operating speed. By the memory 31 is controlled a relay 32, whose switch contact 33 normally closes a connection between an operating switch 34 and a control input for a high revolutional speed of a wiper motor 33, but when the relay is energised connects the operating switch 34 with the control input of the wiper motor 35 for a low revolutional speed.

The memory 31 controlling the relay 32 is set by the signal which also controls the switching member 21. Thus with the change in the switching condition of this switching member 21 the relay 32 is energised simultaneously and thus the revolutional speed of the wiper motor 35 is reduced, when the high revolutional speed should have been switched on previously via the operating switch. Thus this consuming device is changed over to a lower current consumption as soon as the motor vehicle engine is stopped by an interruption of the ignition circuit 20.

In the embodiment shown the relay 32 is changed over independently of the adjusted mode of operation of the consuming device. It would, of course, be also possible to to choose an embodiment in which this relay 32 is only energised, when the higher revolutional speed is adjusted via the operating switch 34, while the relay must not be energised, when only the lower revolutional speed is adjusted via the operating switch 36.

In the drawing the wiper motor 35 is only shown as an example for such a consuming device whose significance for the road security or operating reliability of the motor vehicle is judged in a way that although a lower-capacity operation is sufficient, a switching off should be prevented in any case. Correspondingly the lighting system could be changed over from high beam to dipped beam or sidelight, when the engine is switched off. The speed of a blower could also be reduced or the heating capacity of a heating installation in the motor vehicle could be diminished. In all these cases it is essential that by the reset signal of the engine-speed-dependent switch 14 the original mode of operation, which had been defined by the operating switch, is restored, as soon as the motor vehicle engine has reached its operating speed and thus sufficient energy is supplied by the generator.

In a motor vehicle there are, however, also consuming devices which are of such a significance that a switching-off of the engine should be prevented, when a functioning of these consuming devices is desired. From the drawing can be seen that the reset input of the delay circuit 22 is controlled by an OR-gate 40. When at one input of this gate 40 a signal appears, the trigger signal of the road-speed-dependent switch 23 does not affect the switching condition of this delay circuit 22. Thus it is avoided that the relay 21 becomes energised and thus a switching-off of the ignition circuit 20 is prevented.

One input of the OR-gate 40 is affected via a switching element 41, which applies a particular consuming device in a motor vehicle to the supply voltage. It is assumed that in the present case this is the electric motor 42 of a power-assisted braking system. Another switching element 43 is actuated, when the foot brake is operated. Also in this case a switching-off of the motor vehicle engine is to be prevented, because for example in vehicles comprising a power-assisted braking system with a hydraulic pump the braking power would be diminished at a standstill of the motor vehicle engine. A further input of the OR-gate 40 is controlled by a switching element 44, which measures the operating current of individual consuming devices, for example of a radio set and the passenger compartment lighting system and releases a switching signal when the operating current is too high. This version is based on the consideration that individual consuming devices have such a low current consumption that the charge condition of the battery is not affected substantially, even if the motor vehicle engine is switched off, but that a switching-off of the engine should indeed be prevented, when the operating current taken from the battery for several consuming devices of this kind adds up to a high value.

The delay circuit 22 is also reset, when the accelerator switch 16 or, generally spoken, the starter switch is actuated, because it has to be ensured that the relay 21 is de-energised during the starting operation of the starter 10 and thus the ignition circuit 20 is again connected to the voltage source.

Furthermore it is indicated in the drawing that the delay time of the delay circuit 22 is adjustable. A capacitor 47 can be seen whose capacity is to be variable, for example in dependence on the switching position of a further switching element 48. This development is based on the consideration that, for example, in the case of a too low level of fuel in the tank the motor vehicle engine is to be switched off very quickly after a standstill of the motor vehicle in the interest of considerable savings of fuel. Thus the switching element 48 can be a fuel sensor.

In the drawing is shown an additional switching-on circuit, which is either conducted via a bridging contact of the clutch pedal switch 15 or a bridging contact of a gear selector switch 50 and the contact of a further relay 51. The relay 51 is controlled via a timing element 52, which is triggered by the output signal of an AND-gate 53. Such an output signal of the AND-gate 53 may be measured, when the delay circuit 22 is set and the current capacity measured by the switching element 44 exceeds a given value. If this is so the relay 51 is energised with delay and thus a switching-on circuit for the starter 10 is effectively connected, insofar as a gear is engaged or the clutch is operated. This version is based on the consideration that in the moment of standstill of the motor vehicle possibly no consuming device is switched on which blocks the timing element 22 via the OR-gate 40, so that the motor vehicle engine is stopped, but that shortly after that the driver switches on so many consuming devices, that a too high operating current is taken from the battery. Thus in this case the motor vehicle engine is automatically re-started and the generator operated.

Finally it is once again pointed out that the drawing does not show all possible alternatives. For example the OR-gate 40 could have further inputs controlled by other switching elements switching on and off the consuming devices. After all it is conceivable, that some customer attached such a priority to the rear window heating, to the lighting system, in particular to the high beam, that switching-off of the engine is not desired, when such a consuming device is switched on. Even if the hazard-warning system were switched on, the delay circuit 22 could be blocked under certain circumstances, because it may be assumed, that there is a dangerous condition and the driver, under certain circumstances, wants to drive away immediately.

In addition to the switching elements switching individual consuming devices further switching elements could also be connected with the OR-gate 40, which further switching elements characterise particular operating conditions in the motor vehicle. For example it would be conceivable to prevent a switching off of the engine, when the clutch is operated, whereby it is assumed that the driver wants to drive away within short. Moreover the engine condition could be interrogated and switching-off of the engine could be blocked at a too high oil temperature or cooling water temperature, because otherwise the engine could be damaged due to the interrupted cooling process. The switching element 44 in the drawing only measures the operating currents of two selected consuming devices. An alternative in which the operating currents of all consuming devices in a motor vehicle are evaluated is, however, also conceivable. The switching threshold of this switching element will be made dependent on the characteristics of the battery and the motor vehicle generator. Especially the switching threshold could depend on the momentary charge condition of the battery in a way that it is much lower with a substantially discharged battery than with a fully charged battery.

The switching element 48 affecting the delay time of the delay circuit 22 could also be linked with the gear selector switch in a way that the delay time is diminished, when a gear is engaged. This version is based on the consideration that, when the gear is engaged, there exists the danger of an unintended actuation of the clutch by the driver. In such a case it is thus desired that the engine is switched off quickly. Vice versa the delay time of the delay circuit 22 could also be prolongued via the switching element 48. Thus for example it is conceivable to provide that, when a particular consuming device is switched on the switching-off of the engine is not blocked, but suspended for a relatively long period of time of, for example, for more than one minute.

Eventually it is also to be mentioned that of course the switching element 44 can measure the momentary value of the operating currents, but that a version seems also to be reasonable, in which the sum of the operating currents is added up over a certain period of time. Thereby it is to be prevented that starter is operated in case a maximally admissible operating current is exceeded.

Instead of the wiper motor 35 a few consuming devices can also be used, whose current capacity can be adjustable. In this connection it is thought of versions in which it is changed over from dipped beam to sidelight or from sidelight to parking light on the side of the oncoming traffic.

In the embodiment shown in the drawing the engine is only started again automatically, when the sum of the operating currents exceeds a given value. However one input of the AND-gate could also be connected to the outputs of the operating switches of functionally important consuming devices, so that the engine is automatically started, when after its switching-off such functionally important consuming devices are switched on.

Finally it has to be mentioned that the present circuit diagram only shows an embodiment in which the motor vehicle engine is switched off automatically after a given delay time. However the same considerations are substantially valid for a version in which the motor vehicle engine may be switched off at random by the driver via a so-called stop button.

What is claimed is:

1. A stop-start device for a motor vehicle engine comprising a starting circuit for starting the engine, which comprises at least one start button bridging a starter switch, and comprising a switching member whose switching condition for switching off the engine is variable through a stop button and/or through a road-speed-dependent switch, characterized in that with the change of the switching condition of the switching member particular consumers in the motor vehicle are changed over to a mode of operation with a lower current consumption;

wherein the revolutional speed of the electric motor for a power-assisted braking system or steering system is reduced;

wherein upon switching on the engine again the mode of operation adjusted through the operating switch (34) of the consuming device (35) before switching off is again turned on;

wherein the switching condition of the switch member (21) may be affected by further switching elements (41, 43, 44) which are controlled in dependence on particular operating conditions on the motor vehicle and, when these particular operating conditions exist, prevent a change in the switching condition of the switching member (21) irrespective of the stop button and/or the road-dependent switch (23) being actuated;

wherein further switching elements are dependent on the operating conditions of the engine and especially in the case of a too high oil temperature and/or a too high cooling water temperature a switching-off of the engine is prevented; and, in which the switching member is controlled via a delay circuit in dependence on a road-speed dependent switch, and wherein the delay time of the delay circuit (22) may be affected in dependence on the switching position of particular switch elements (48).

2. A device according to claim 1, characterised in that the delay time of the delay circuit (22) is increased, when particular functionally important consuming devices are switched on.

3. A device according to claim 2, characterised in that the delay time of the delay circuit (22) is reduced, when the fuel level in the tank falls below a given value.

4. A device according to claim 1, characterised in that the delay time of the delay circuit (22) is reduced, when a gear is engaged.

5. A device according to claim 4, characterised in that the switching-on circuit is closed, when after switching-off the engine a functionally important consuming device is switched on and/or the current consumption of selected or all consuming devices exceeds a given value.

* * * * *